(12) United States Patent
Jansson et al.

(10) Patent No.: US 6,563,251 B2
(45) Date of Patent: May 13, 2003

(54) ENERGY RECOVERY IN ELECTROMECHANICAL MOTORS

(75) Inventors: Anders Jansson, Uppsala (SE); Karl Håkansson, Uppsala (SE); Stefan Johansson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 0 days.

(21) Appl. No.: 09/785,314

(22) Filed: Feb. 20, 2001

(65) Prior Publication Data

US 2002/0113563 A1 Aug. 22, 2002

(51) Int. Cl.[7] ................................................. H02N 2/06
(52) U.S. Cl. .................................. 310/316.03; 310/317
(58) Field of Search ............................. 310/316.03, 317

(56) References Cited

U.S. PATENT DOCUMENTS 5,264,752 A    11/1993   Savicki ................. 310/316.03

FOREIGN PATENT DOCUMENTS

| DE | 198 58 250 A1 | 6/2000 | ............ H02N/2/00 |
| EP | 1 001 474 A1 | 5/2000 | ........... H01L/41/04 |

*Primary Examiner*—Thomas M. Dougherty
(74) *Attorney, Agent, or Firm*—Young & Thompson

(57) ABSTRACT

In a method according to the present invention, charging and discharging of motor phases (10A, 10B) in an electromechanical motor is performed with a small voltage difference between the voltage source and the capacitive load of the motor phase (10A, 10B). This is accomplished by connecting a series of voltage sources (36), one at a time. Energy from the discharging operation is stored to be used in subsequent charging operations. In a device according to the present invention, the voltage sources (36) are preferably provided by means of capacitive or induction voltage step-up or step-down circuits. Preferably, switches (34) control the charging and discharging. In a preferred embodiment, the capacitance of one motor phase (10A) is used for storing charge resulting from the discharge from another motor phase (10B).

22 Claims, 9 Drawing Sheets

ENERGY RECOVERY IN ELECTROMECHANICAL MOTORS

TECHNICAL FIELD

The present invention relates generally to drive and control of electromechanical motors or other actuators having capacitive motor/actuator phases, and in general to methods and devices for reducing the power consumption of such motors or actuators.

BACKGROUND

There are numerous applications with the need for miniaturised motors that are able to make controlled fine positioning. Among these, portable devices, such as cameras, telephones and portable computers, have additional demands for low power consumption, low weight and price.

Electromechanical motors, e.g. piezoelectric motors using repetition of mechanical steps, are potential candidates in these applications. One of the present drawbacks is the low efficiency due to energy losses in the drive electronics. Previous solutions have included mechanical resonance in the piezoelectric components, which gives a certain energy saving possibility, at least in theory. For fine positioning and in particular linear motors, resonant motors are not ideal and e.g. inertial or quasi-static drive mechanisms are preferred. It is possible to use electric resonance to reduce the power losses, but it reduces the possibility to optimise waveform shapes and to position at fractions of steps. The motors that are able to make controlled quasi-static mechanical stepping are so far driven with waveform generators with no energy saving capacity.

Electromechanical motors, such as the piezoelectric motors, have a number of drive elements comprising portions that change shape in accordance with the applied electric voltage. From an electrical point of view motor phases comprising drive element portions are capacitive, and the common solution to drive these capacitors is to use an amplifier circuitry. Basically an analogue control signal is used as an input signal to an amplifier, which provides the appropriate charging/discharging voltage to the motor phase. When charging up a motor phase, all current originates from the energy source of the amplifier. During charging of the motor phase from zero to the voltage of the energy source, it is easily shown that the energy losses in the amplifier and connectors are at least $\frac{1}{2}CU^2$, where C is the capacitance of the motor phase and U is the energy source voltage. When completely discharging the motor phase to ground, another loss of $\frac{1}{2}CU^2$ is experienced. This means that in every charging-discharging cycle, a total energy amount of at least $CU^2$ is lost. Since the operating frequencies for electromechanical motors is typically in the kHz range, the total energy consumption becomes large. Most of the losses are converted into heat in the electronics parts of the devices, hence the drive electronics normally requires relatively large volumes. This is of course disadvantageous for miniaturised devices. Further, in battery driven devices, high losses will result in reduced operation time.

One way to decrease the loss amount is to reduce the operating voltage and/or capacitance of the motor phases. However, this will obviously influence the performance of the motor phase in a disadvantageous manner.

Some solutions of how to reduce energy losses in the drive circuits for motors or other actuators with capacitive loads have been presented, see references [1] and [2]. Common to these solutions is that an inductive component is used to store the energy during the energy transfer. The drawbacks with energy saving based on inductive components are the non-negligible volume of low-loss inductors and the need for advanced control algorithms during charging and discharging. In applications where the total volume of motor and drive electronics needs to be minimised, a solution with no or extremely small external components is desired. Further, complex control algorithms will put particular demands on the control electronics increasing both price and physical size.

In reference [3] the usefulness of an inductor in driving piezoelectric motors has been presented. During a discharge operation, a switch is closed for a period of time, in order to build up a current in the inductor. The current is then directed to a power supply, by opening the switch, making use of the hereby induced voltage in the inductor. Unfortunately, switch control timing is not entirely simple and efficient inductors are rather voluminous. In practise, this inductor-based design has not yet been adopted for use with miniaturised piezoelectric motors.

SUMMARY

A general object of the present invention is to provide methods and devices for reducing energy losses in the drive electronics of electromechanical motors or other actuators having capacitive motor phases. Another object of the present invention is to reduce the volume of the drive electronics. A further object of the present invention is to provide less complex control means for the drive electronics of electromechanical motors. Yet another object is to provide operating voltages for the motor phases, which exceed the voltage of the power supply.

The above objects are achieved by methods and devices according to the enclosed patent claims. In general words, charging and discharging of motor phases in an electromechanical motor is performed with small voltage difference between the voltage source and the capacitive load. Energy from discharging operations is stored to be used in subsequent charging operations. The voltage sources are preferably provided by means of capacitive voltage step-up or step-down circuits, whereas switches control the charging and discharging events.

One advantage with the present invention is that the energy losses are reduced to a fraction of the losses for transistor-based prior art devices. A further advantage is that the volume of the drive electronics now can be made very small. Yet another advantage with step-up circuit embodiments is that the motors can be driven by low voltage power supplies.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present invention, "motor phase" refers to one or more electromechanical drive element portions driven together by one and the same voltage signal. The capacitive motor phases have two terminals, of which one terminal is, if not stated otherwise, connected to ground and the other terminal is subject to voltage regulation. Sometimes, the term "motor phase" refers to the regulated terminal only. The term "motor phase" is used even in actuator device, which are not true "motor".

The present invention is exemplified by electromechanical motors, but can be applied for any actuator system working with capacitive "motor phases".

Figure 1:
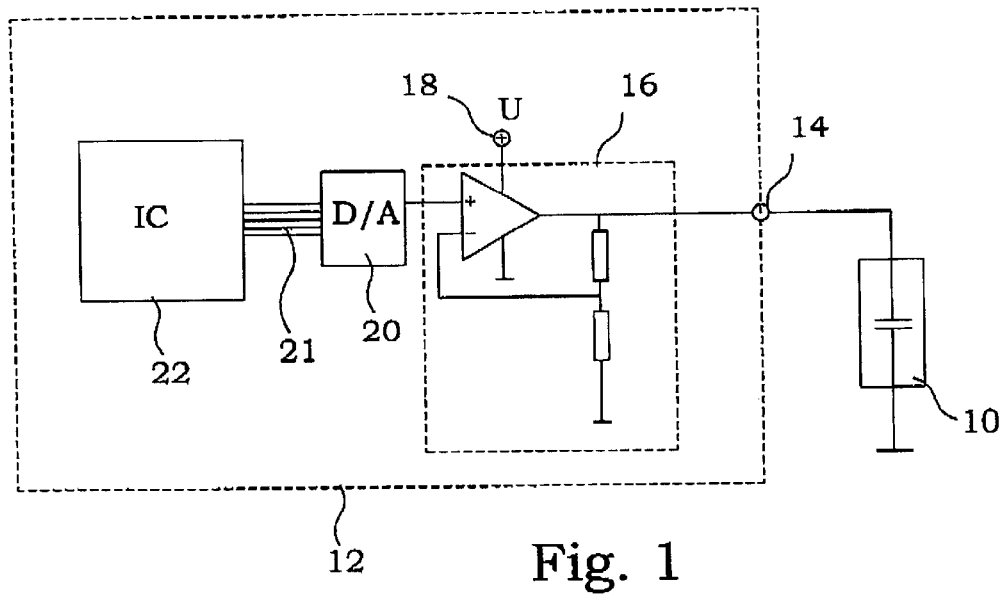
FIG. 1 is a circuit diagram for a typical drive unit for a motor phase according to transistor-based prior art.

FIG. 1 illustrates a typical drive unit 12 used for driving a motor phase 10 according to prior art. The drive unit 12 comprises an integrated circuit 22, driven by a low voltage power supply $U_{logic}$. The integrated circuit 22 provides a digital signal to a digital-to-analogue converter 20 via a data bus 21. An analogue voltage is subsequently forwarded from the digital-to-analogue converter 20 to an amplifier circuit 16, regulating the voltage of an output terminal 14 to the motor phase 10.

When charging the motor phase, a charge will flow from the amplifier circuit 16 to the motor phase 10. A loss of energy will appear during this charging. Since the charge is basically fetched from the power source 18 at voltage U, the loss in the entire drive unit depends on the difference between the voltage of the motor phase and the power source voltage U. Ordinary amplifiers can be considered to adjust their resistance in such a way that the voltage drop over the amplifier results in the requested output voltage.

The power losses in the amplifier will then simply be the voltage drop times the current. This is true using any transistor-based voltage regulator according to prior art. In this disclosure, such energy losses will be referred to as energy losses from resistive voltage drop during charge transfer.

When discharging the motor phase, the charge of the motor phase 10 will be conducted to ground. If the motor phase 10 was charged to a voltage of $U^*$, the energy stored in the motor phase 10 is equal to $\frac{1}{2}CU^{*2}$. With no energy-retrieving features, this energy is lost during discharging the motor phase.

The electrical losses upon charging and discharging can be reduced. An important component in this energy saving is that when a motor phase is discharged, the charge should be brought to a charge sink in such a way that at least a part of its energy can be used for supplying charge during a subsequent or simultaneous charging operation. As already mentioned, energy retrieving can be done using inductor-based charge-pumping, whereas the present invention uses a different approach, having advantageous features. According to the present invention, by letting the charge sink have a voltage which is only slightly less than the motor phase voltage, the energy loss from resistive voltage drop is reduced significantly. By gradually decreasing the charge sink voltage, the motor phase can be totally discharged. In the same manner, during recharging of the motor phase the voltage difference between the motor phase and the voltage source should be kept low at all instances.

One way to obtain small differences between the voltage source and the capacitive load of the motor phase is to use a series of essentially independent voltage sources when cycling the motor phases. As mentioned above, transistor-regulated voltages are of no use, but there are some other solutions to achieve a series of voltages that fulfil the demands of the present invention for a electromechanical motor driver.

If a charge sink comprising a number of n equally spaced voltage sources was used during discharging, and the motor phase was switched by turns between these voltages, the energy loss will be 1/n times $\frac{1}{2}CU^{*2}$. The higher number of levels, the lower the energy loss will be.

Analogously, during the charging operation, the motor phase is preferably charged from a voltage source having a voltage only slightly higher than the motor phase. The energy loss during charging will in the same manner as above be reduced by a factor of 1/n, if n equally spaced voltage levels were used.

In an ideal case, the reduction will be larger and larger for an increased number of voltage levels. However, in practise, the switching between the voltage levels will be associated with a certain energy loss, which will limit the number of useful voltage steps.

Figure 2:
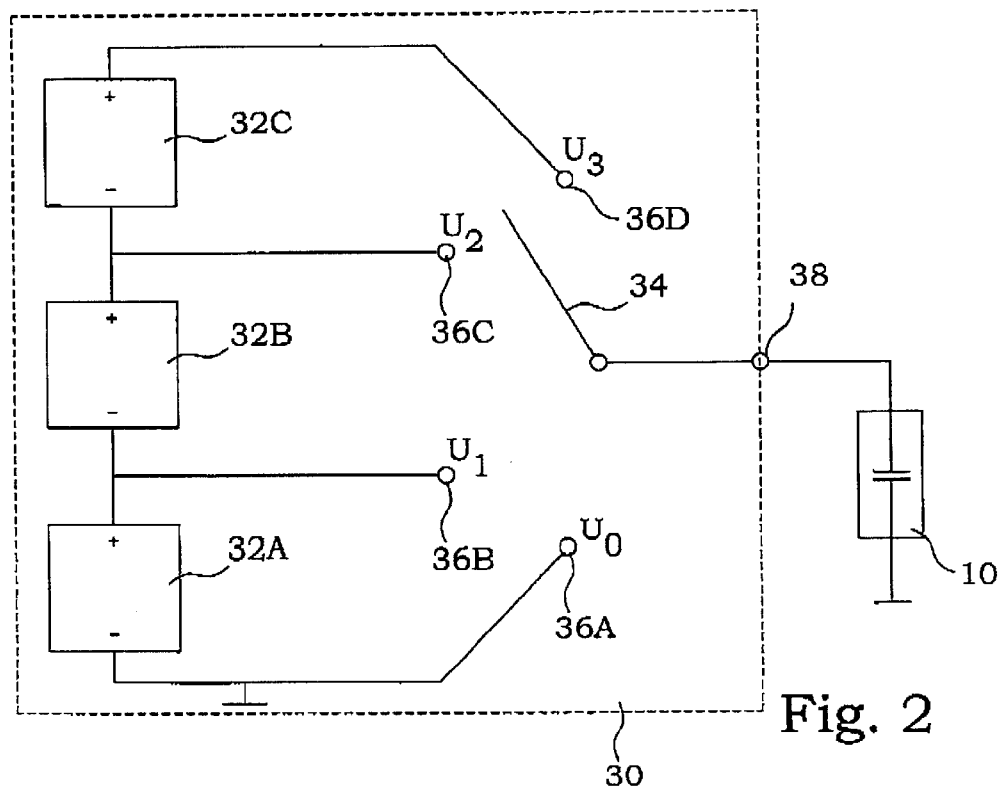
FIG. 2 is a circuit diagram of an embodiment of a drive unit with three serially connected power supplies according to the present invention.

A simple embodiment is illustrated in FIG. 2. According to this embodiment of the present invention a drive unit 30 comprises three separate power supplies 32A, 32B and 32C providing equal differential voltages U. The power supplies are connected in series, and the negative terminal of the first one 32A is connected to ground. A switch 34 is provided with four selectable voltage source terminals 36A, 36B, 36C and 36D. Voltage source terminal 36A is grounded, having a voltage of $U_0=0$. Voltage source terminal 36B is connected to the positive terminal of the first power supply 32A, and exhibits a voltage of $U_1=U$. Similarly, the voltage source terminal 36C is connected to the positive terminal of the second power supply 32B, and exhibits a voltage of $U_2=2U$. Finally, voltage source terminal 36D is connected on top of all power supplies, exhibiting a voltage of $U_3=3U$. An output terminal 38 of the drive unit 30 can be connected to any of the voltage source terminals 36A–D by the switch 34. A motor phase 10 is connected between the drive unit output terminal 38 and ground. By operating the switch 34 successively from voltage source terminal 36A, 36B, 36C and finally to voltage source terminal 36D, a stepwise increasing voltage is provided to the motor phase 10. According to the discussion above, such stepwise increasing voltage is advantageous when charging the motor phase 10, since the resistive voltage drop is kept low at all times.

During discharging of the motor phase 10, the switch 34 is instead operated back stepwise from voltage source terminal 36D, 36C, 36B and finally to the ground potential of voltage source terminal 36A. The discharging will thus take place to gradually decreasing voltages. Preferably, the voltage regulating circuit should be arranged to be able to accept a charge coming from the motor phase.

Figure 3:
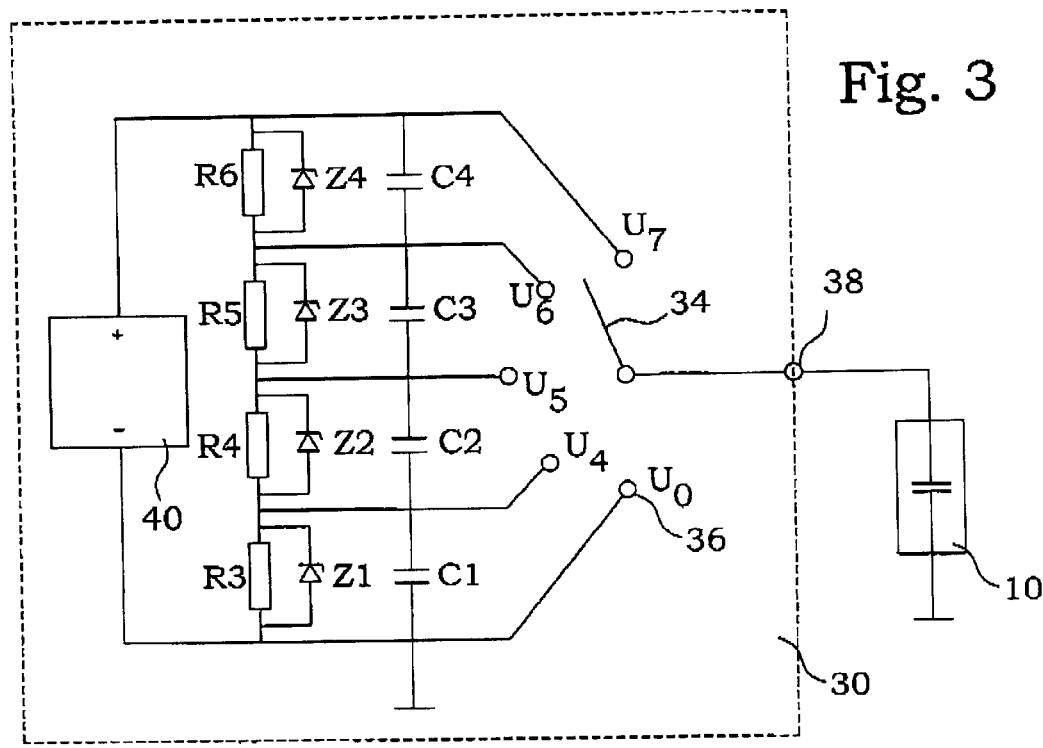
FIG. 3 is a circuit diagram of an embodiment of a drive unit with four voltage sources fed from a single voltage supply according to the present invention.

Another embodiment of the present invention is illustrated in FIG. 3. Here resistors and Zener diodes are used for providing a voltage division, and capacitors are providing a charge storage for each voltage. The motor phase is here omitted in order to reduce the complexity of the figure. The drive unit 30, comprises one single power supply 40, with output voltage U. Four resistors R3–R6 are serially connected over the power supply 40. In parallel with each of these resistors R3–R6, a respective capacitor C1–C4 and a respective Zener diode Z1–Z4 is provided. Normally, Z1 can be omitted. The switch 34 has in this embodiment five selectable voltage source terminals 36, being connected to the power supply poles and in between each resistor R3–R6. The nominal terminal voltages $U_0$, $U_4$, $U_5$, $U_6$, $U_7$ are, if the resistors R3–R6 have identical values, equal to 0, ¼U, ½U, ¾U and U, respectively.

At nominal voltages, the Zener diodes do not conduct significantly. During a discharging operation, the intermediate voltages should be allowed to increase somewhat in order to store energy. Therefore, the values of the resistors should be high enough not to regulate the voltages significantly on a cycle time scale, nor should the Zener diodes become activated. However, if there are considerable energy losses in the motor (or work being delivered by the motor) in the intermediate voltages, there will be a need for considerable support of these voltages through the resistors and, if voltages drop enough, through the Zener diodes. In this situation, although still superior transistor-based prior art, further improvement can be made by supporting the intermediate voltages by means of voltage stepping. There are several step-up/step-down techniques available, using inductive or capacitive charge transfer mechanisms.

Figure 4A:
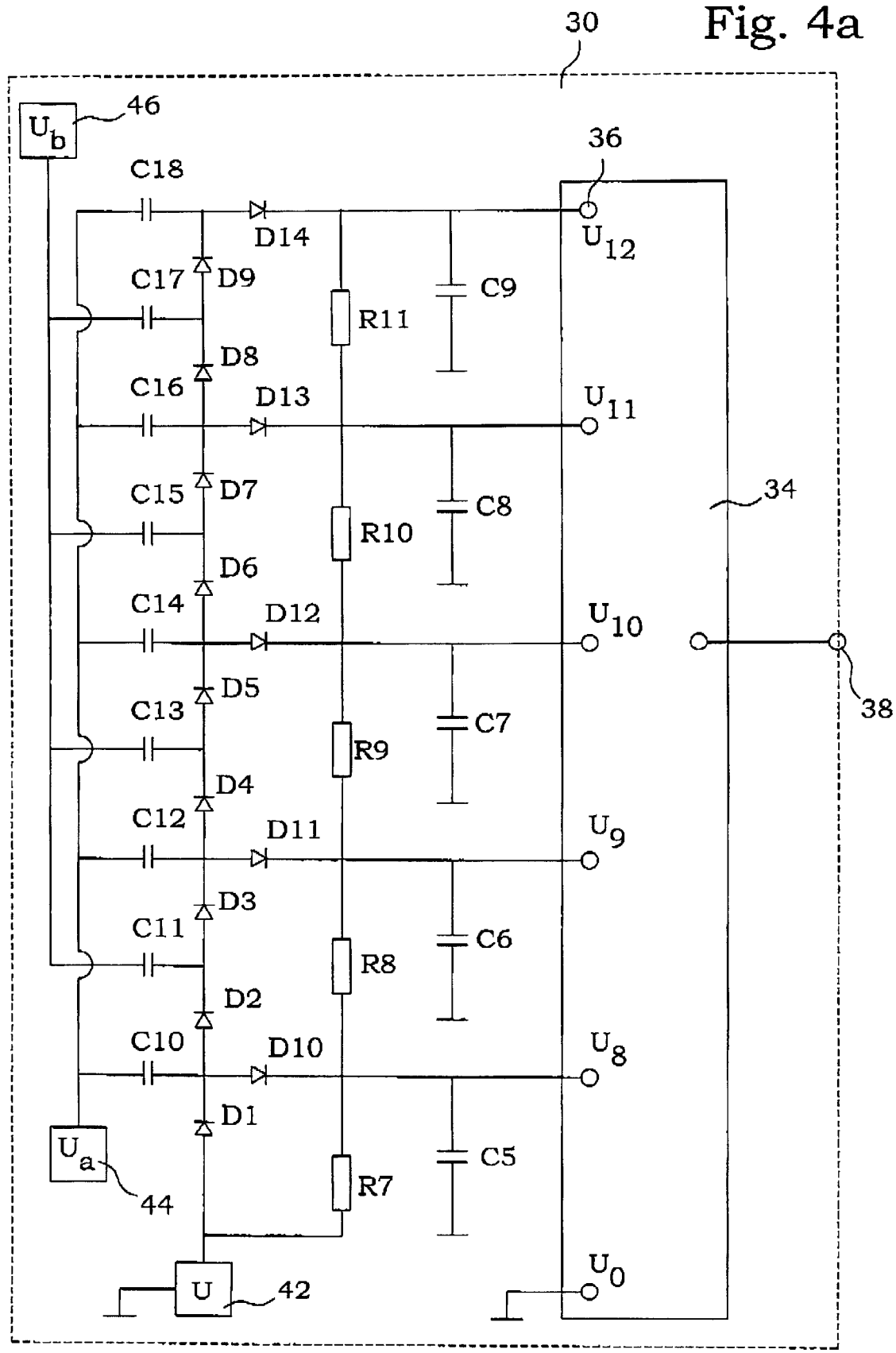
FIG. 4a is a circuit diagram of an embodiment of a diode-based charge-pumped drive unit with five discrete voltage steps according to the present invention.

In FIG. 4a, a drive unit 30 is illustrated, in which the voltage source terminals are supported by diode-capacitor-based charge-pumping. Nine diodes D1–D9 are connected in series, directed in the same direction. The anode of the first diode D1 is connected to a power supply 42 of voltage U, and the diodes D1–D9 are directed away from the power supply. Between every diode D1–D9 and on top of the diode series, a first side of a capacitor C10–C18 is connected. The other side of each capacitor is connected to a low voltage signal source. Every second capacitor C10, C12, C14, C16 and C18 are hereby connected to a first low voltage signal source 44 giving a voltage signal $U_a$, and the remaining capacitors C11, C13, C15, C17 are connected to a second low voltage signal source 46 giving a voltage signal $U_b$. Besides a ground terminal, five voltage source terminals 36 are connected via a respective diode D10–D14 to each one of the first sides of the capacitors C10, C12, C14, C16 and C18. The diodes D10–D14 are directed to let a current flow towards the voltage source terminals 36. Voltage source terminals 36 are serially interconnected by resistors R8–R11, preferably of equal value, and a resistor R7 of half that value is connected between the voltage source terminal next to ground and the positive terminal of the constant power supply 42. Capacitors C5–C9 are connected between each voltage source terminal and ground.

Figure 5:
FIG. 5 is a diagram illustrating voltage pulses used in the embodiment of FIG. 4.
Figure 5:

In FIG. 5, typical voltage signals from the voltage signal sources 42 and 44 are illustrated. The first voltage signal source 42 provides in this embodiment a square voltage signal, having an amplitude of U. The second voltage signal source 44 provides a similar signal, but inverted. When the first voltage signal source 42 gets high, the second voltage signal source 44 gets low, and vice versa.

By applying the voltage signals of FIG. 5 to the circuitry of FIG. 4a, one skilled in the art realises that a charge-pumping function is achieved. When the first voltage signal $U_a$ gets high and the second voltage signal $U_b$ gets low, a current can flow from the first voltage signal source 42 to the second one 44. The diodes D2, D4, D6, D8 and D10–D14 conduct the current, building up a charge in the capacitors C5–C9. When instead the second voltage signal $U_b$ switches to high and the first voltage signal $U_a$ switches to low, a current flows from the second voltage signal source 44 to the first one 42. Now, the diodes D2, D4, D6 and D8 are restrictive and instead the diodes D1, D3, D5, D7 and D9 conduct the current.

At steady state, when no more charges can be pumped, the potential at the first side of the first charge-pumping capacitor C10 varies from U to 2U, depending on whether the driving signal $U_a$ on the other side of C10 is low or high. Hence, the potential at the voltage source terminal $U_8$ is 2U. When the driving signal $U_b$ of the second charge-pumping capacitor C11 is low, the potential at the first side of this capacitor will be at its lowest point. At this instant, the potential at C10 is 2U, which therefore becomes the lowest potential of C11, thereby defining the high potential of C11 to be 3U when the driving signal $U_b$ gets high. Extending this reasoning throughout the circuit, it can be deduced that the potentials at the voltage source terminals are $U_0=0$, $U_8=2U$, $U_9=4U$, $U_{10}=6U$, $U_{11}=8U$ and $U_{12}=10U$. Due to voltage drop at the diodes, actual potentials will be somewhat lower. Still, using low voltage drop diodes, the efficiency of this charge pump is satisfactory even when powered from as low as 3.6 V.

When cycling the motor phases, the highest voltage source terminal does not get a refund during discharging, which is why most of the energy consumption will be associated with the charging operation from the next highest to the highest voltage level.

In the sketch of FIG. 4a, voltage source terminals originate from every second charge-pumping capacitor. Naturally, there is no a priori reason for not introducing voltage source terminals for every charge-pumping capacitor. This is a question of the number of levels wanted and the voltage spacing given by the power supply voltage.

The operation of the switch 34 is analogous to earlier description.

Figure 4B:
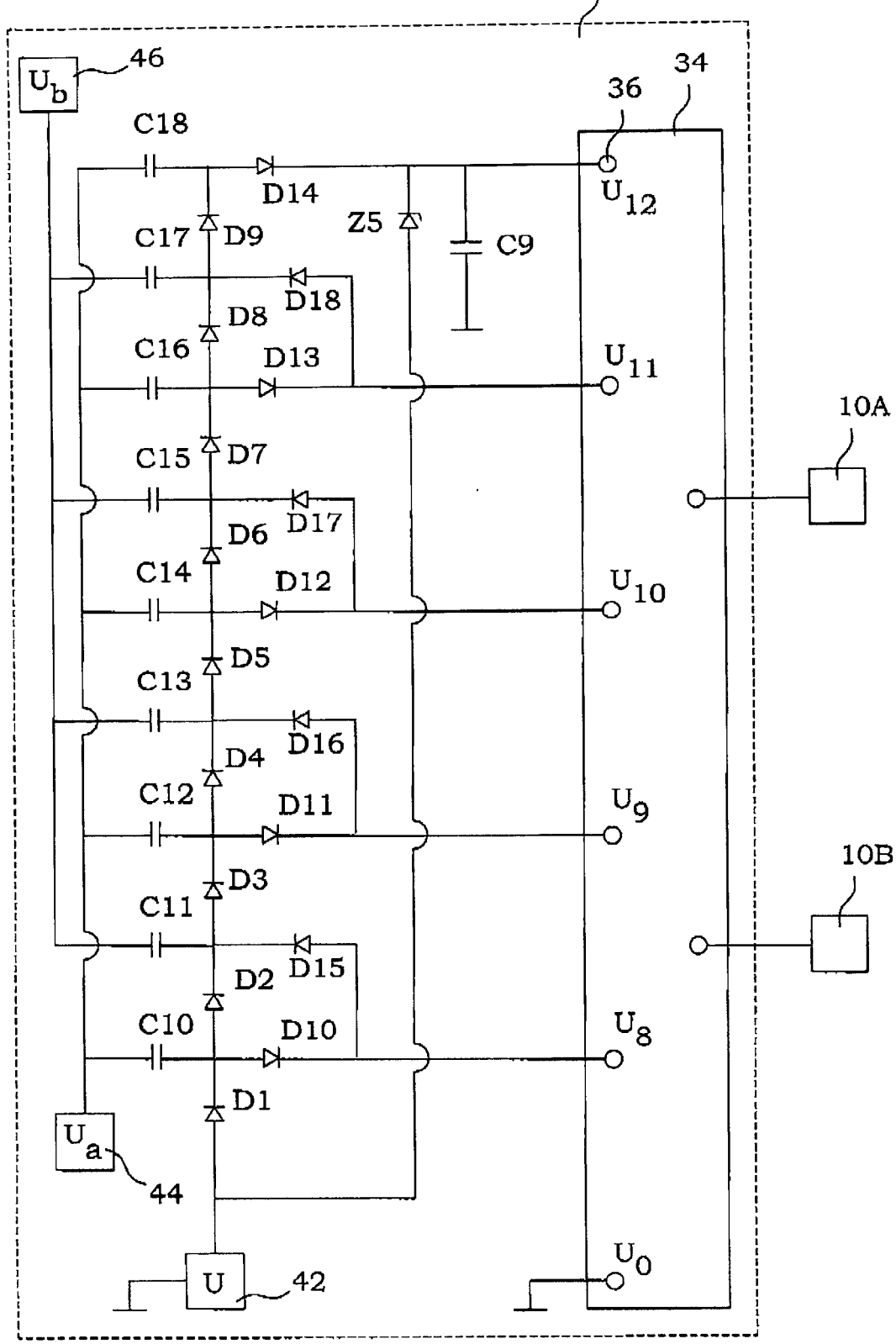
FIG. 4b is a circuit diagram of an embodiment of a diode-based charge-pumped drive unit with five voltage sources for driving two motor phases according to the present invention.

Another similar solution is illustrated in FIG. 4b. The drive unit 30 is similar to the one in FIG. 4a, with a few exceptions. The capacitive buffering of each voltage source terminal 36 is removed except for the top voltage source terminal U12. The remaining voltage source terminals 36 can thus be considered to be capacitively non-buffered, at least not directly. The resistors R7–R11 (FIG. 4a) are also removed. Instead, a diode D15 is connected between voltage source terminal $U_8$ and a point between the diodes D2 and D3. Diodes D16–D18 are connected in an analogue manner to the voltage source terminals $U_9$–$U_{11}$. The voltage source terminal with the highest voltage $U_{12}$ is still buffered with a capacitor C9. This voltage source terminal is also connected to the voltage supply U via a Zener diode Z5, defining the maximum voltage of the highest level. This embodiment has the advantage that charge also can be pumped from the respective voltage source terminal. The need for capacitors connected directly to each voltage source terminal will then vanish, since the charge from the motor phase during discharging can be handled anyway. Also the serially connected resistors (FIG. 4a) stabilising the voltages can be omitted. This decreases the volume of the circuit, while the energy saving capability can still be fair under certain circumstances.

An electromechanical motor has generally more than one motor phase. These phases are often driven out-of-phase to each other. This means that a charging operation of one motor phase very well may coincide with a discharging operation of another motor phase. Starting from FIG. 4b, an energy efficiency comparison with transistor-based prior art performance will be performed. Consider two motor phases, 10A and 10B, where 10A is to be fully recharged from the ground level and motor phase 10B is to be fully discharged from highest level. The switch 34 is in this embodiment a double switch, i.e. a switch having two independent output terminals. Each of these output terminals are connected to one motor phase.

In a first step, motor phase 10A is connected to voltage source terminal U11 whereas motor phase 10B is connected to voltage source terminal U8. 10A is hereby discharged one level, and the energy is pumped back to the top level, which is more efficient than dumping all the energy to ground. Motor phase 10B is charged to the first level using charge-pumping from the low voltage power supply, which is much better than taking charges from the top level according to prior art. If the voltage of U8 was to be a transistor-regulated voltage, the inherent resistive drop would be the difference between U8 and the transistor supply voltage U12, which is about 4 times the U8 voltage.

In a second step, motor phase 10A is connected to voltage source terminal U10 whereas motor phase 10B is connected to voltage source terminal U9. Energy consideration is analogous to the first step. In a third step, motor phase 10A is connected to voltage source terminal U9 whereas motor phase 10B is connected to voltage source terminal U10. In this situation, there would be no use pumping more energy to the top level, since it would only dissipate through the Zener diode. Fortunately, charges are now being pumped from motor phase 10A to motor phase 10B, so that motor phase 10A is part of the voltage source, i.e. a charge donor, and motor phase 10B is part of the voltage sink, i.e. a charge acceptor. The voltage difference between charge donor and acceptor is small, and the associated resistive drop during charge transfer is very much lower than for a corresponding individual voltage regulation of the phases using transistor-based prior art.

In a fourth step, motor phase 10A is connected to voltage source terminal U8, whereas motor phase 10B is connected to voltage source terminal U11. Energy consideration is analogous to the third step. In a final step, motor phase 10A is grounded, whereas motor phase 10B is connected to the top level. When charging motor phase 10B from the U11 voltage to the top level, the energy stored in the first and second steps eliminates the need for further charge-pumping to the top level at this stage. This is quite different from the embodiment of FIG. 4a, in which this final step would ideally be the only step associated with charge-pumping, requiring the top level to be restored by pumping charges all the way (through 5 levels) from the power supply. Counting for each step the overall number of levels the charges passes through, the embodiment of FIG. 4b would be expected to consume around twice the energy of the embodiment of FIG. 4a for the charging/discharging operations described. Actual consumption will be somewhat lower than this, which is due to the fact that a voltage source terminal of FIG. 4b is less buffered, thus adjusting its voltage to the load, minimising the resistive voltage drop between the terminal and the load. Instead, the voltage of the terminal and load will then gradually change together during charge-pumping.

Summing up, the performance of the embodiment of FIG. 4b relies on motor phases as part of the voltage sources, and the compact design of the embodiment of FIG. 4b can then be of interest, although the embodiment of FIG. 4a may require somewhat less energy. Additionally, this solution is well suited for compact implementations of bipolar switches, described further below.

Figure 6A:
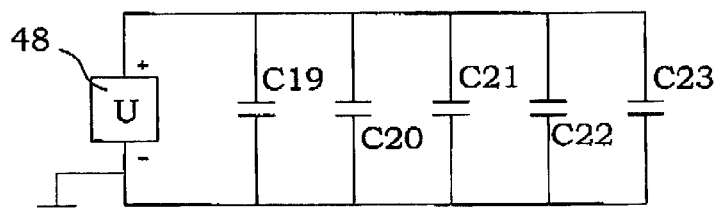
FIGS. 6a, 6b and 6c illustrate an embodiment of a capacitor-based voltage step-up drive unit with six voltage sources according to the present invention.
Figure 6B:
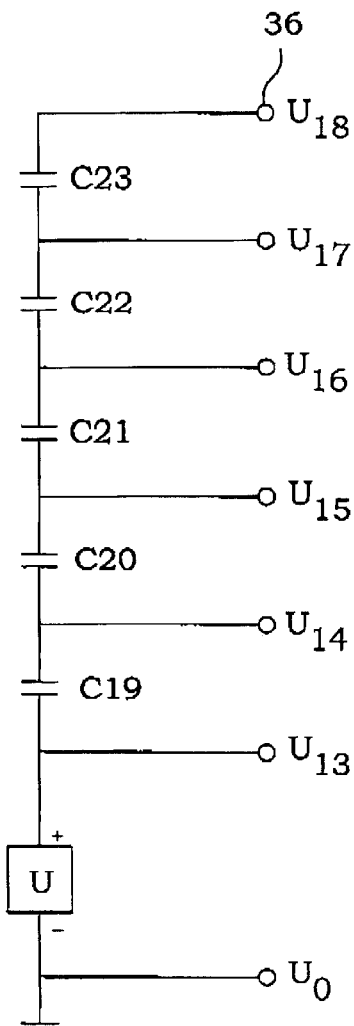
Figure 6C:
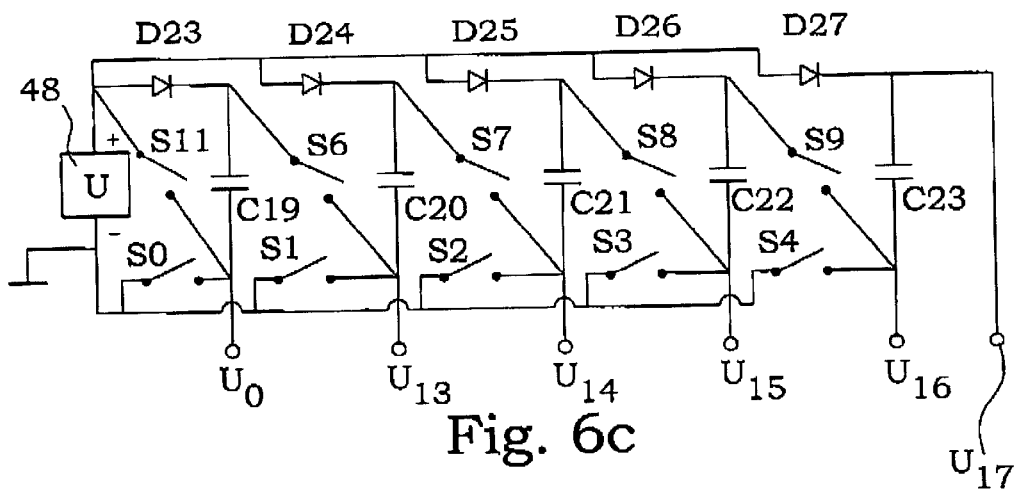

Another voltage stepping technique is illustrated by an embodiment in FIGS. 6a–6c. In FIG. 6a, the connections are shown for a first mode of operation. Five capacitors C19–C23 are connected to a power supply 48. The voltage over each single capacitor C19–C23 will then also be equal to U. In FIG. 6b, the connections for a second mode of operation is shown. Here, the five capacitors C19–C24 are instead connected serially on top of the power supply. A voltage source terminal 36 is connected to each capacitor, which in an ideal case provides the voltages of $U_0=0$, $U_{13}=U$, $U_{14}=2U$, $U_{15}=3U$, $U_{16}=4U$, $U_{17}=5U$ and $U_{18}=6U$.

The transformation of the circuits illustrated in FIGS. 6a and 6b is possible to realise in different manners. A switch-based embodiment is illustrated in FIG. 6c. The positive terminal of each capacitor is connected to the power supply, via a respective diode D23–D27. The negative voltage terminals of the capacitors can be switched to ground by a respective switch S1 to S4, whereas another four switches S6–S9 are provided between the low voltage end of each capacitor and the high voltage end of one of its neighbors. In this manner an easy switching between the schemes of FIGS. 6a and 6b is achieved. By opening the switches S6–S9 and S11 and closing the switches S0 to S4, the scheme of FIG. 6c will be equivalent to the scheme of FIG. 6a. By instead opening the switches S0–S4 and closing the switches S6 to S9 and S11, the scheme of FIG. 6c will be electrically equivalent to the scheme of FIG. 6b. Should there be a need to transfer charges back to the power supply, the diodes D23–D27 must be replaced by switches.

In the above embodiments, there are switches directing each motor phase to the desired voltage terminal. These switches are typically FET or CMOS switches. However, it has been found that bipolar transistor switches can be used as well.

Figure 7:
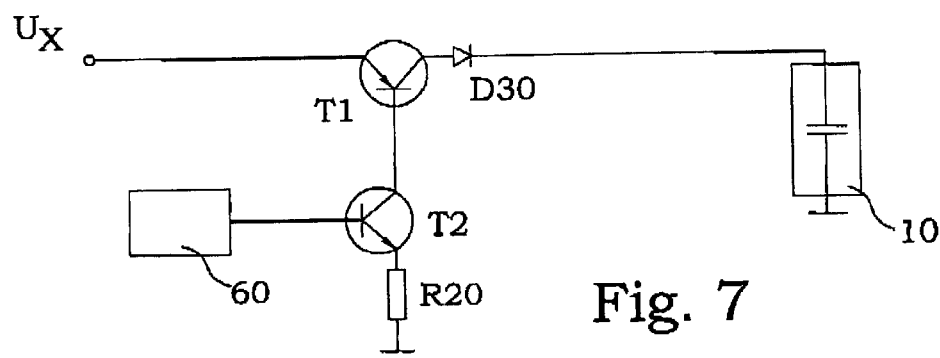
FIG. 7 is a circuit diagram illustrating a one-way bipolar transistor switch useful in the present invention.

In FIG. 7, the basics of a one-way switch are illustrated. A pnp bipolar transistor T1 is connected with its emitter to a voltage terminal Ux. The collector of transistor T1 is connected to a motor phase 10 via a diode 30. The base of the transistor T1 is connected to the collector of a npn bipolar transistor T2. The base of the transistor T2 is connected to a logics control unit 60, and the emitter is grounded via a resistor R20. When the signal from the logics control unit 60 is low, current flow through the transistor T2 is prohibited, and thus no current can flow from the voltage terminal Ux to the motor phase 10. When the signal from the logics control unit 60 is high, the transistor T2 conducts and so does the transistor T1. A current can thus flow to the motor phase 10. The diode D30 is used for protection against reversed polarity of the transistor T1 when the voltage of the motor phase 10 is higher than the voltage at the voltage terminal Ux. Obviously, D30 is not needed if Ux is the highest voltage in the system.

Figure 8:
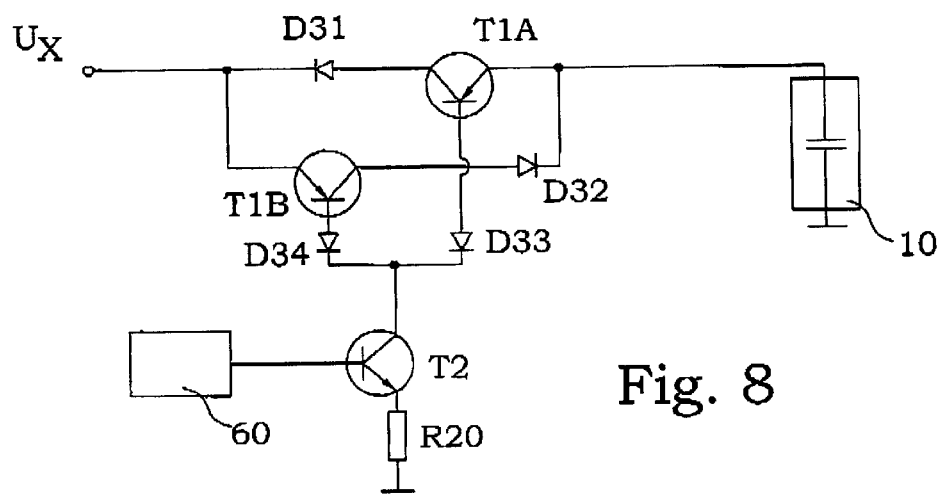
FIG. 8 is a circuit diagram illustrating a bidirectional bipolar transistor switch useful in the present invention.

In FIG. 8, two one-way switches have been combined to get a bidirectional switch. Two pnp transistors T1A and T1B and a respective collector diode D31, D32, are arranged for ability to conduct in either direction. Instead of driving the bases of transistors T1A and T1B separately, the bases have been connected via diodes D33, D34 to the collector of one and the same npn transistor T2. Again, these diodes D33, D34 are for protection against reversed polarity. As can be seen, the bipolar switch is easily controlled from low voltage logics control 60.

Figure 9:
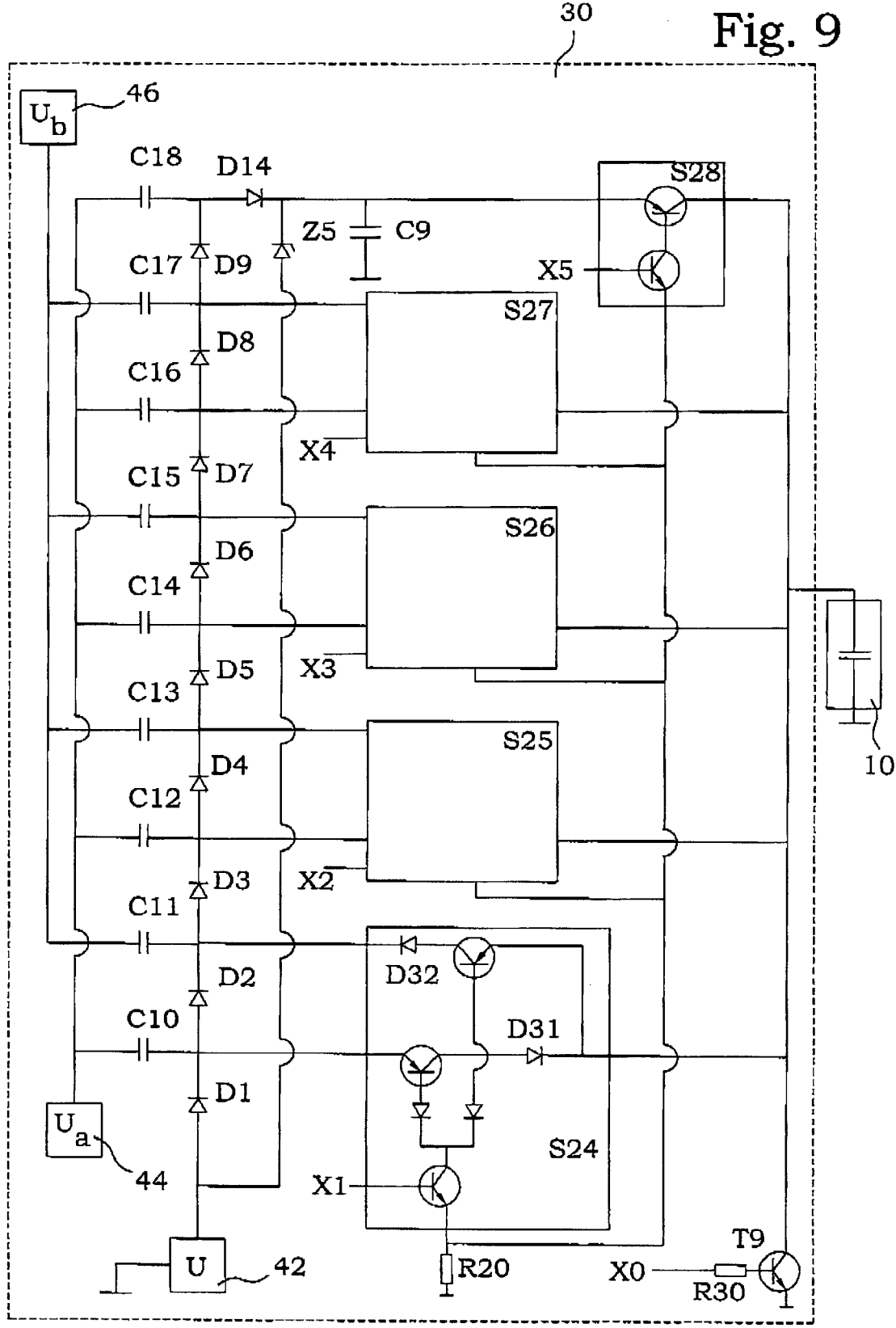
FIG. 9 is a circuit diagram illustrating an embodiment similar to the one shown in FIG. 4b, with implemented switches according to FIG. 7 and FIG. 8.

This type of bidirectional bipolar switch is cheap and well suited for controlling e.g. the embodiment illustrated in FIGS. 4a and 4b. In FIG. 9, four switch devices S24–S27 have been implemented in the circuitry of FIG. 4b. The diodes D10–D13 and D15–D18 of FIG. 4b are incorporated into the switch circuit and correspond to the diodes D31 and D32, respectively. Additionally, a one-way switch S28 according to FIG. 7 is also incorporated for the highest voltage, and a single transistor T9 and resistor R30 are used for a ground switch. All outputs of the switches are interconnected and connected to the motor phase to be controlled.

Furthermore, it is quite easy to incorporate a current limit into a bipolar switch, in order to change the voltage of the motor element more smoothly. This is e.g. performed by introducing a resistor and a regulating transistor. The value of the resistor is chosen to give a 0.6 V drop over the resistor when the current limit is reached, and the regulating transistor will then start to limit the base current of the switch transistor. Interestingly, whereas diodes decrease the effective voltage of the source, resistors in the switches solely influence the speed at which the charge transfer occurs, not the energy dissipation for a given charge transfer.

Figure 10:
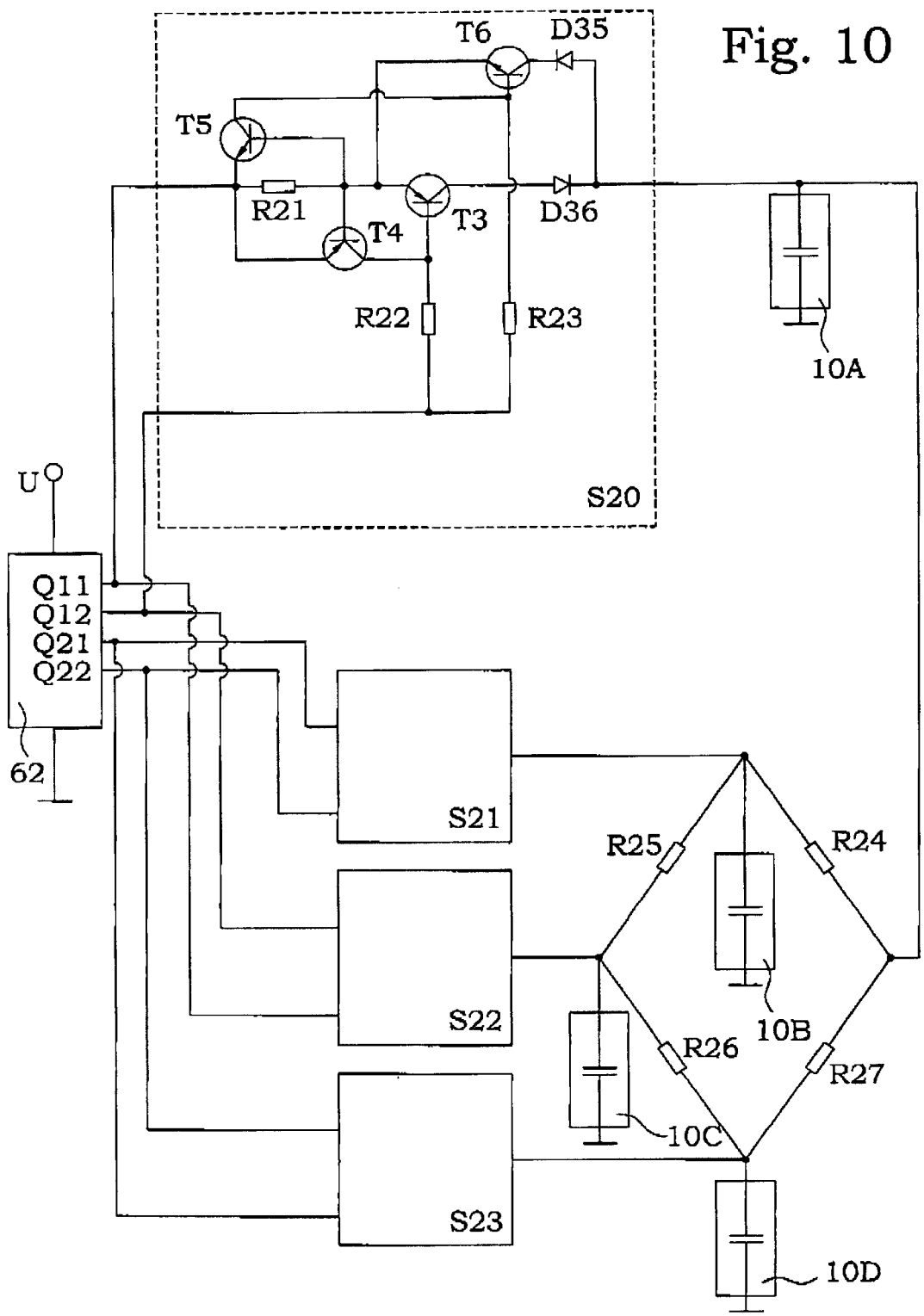
FIG. 10 is a circuit diagram illustrating switches with inherent current limitation, here used together with a stepper motor driver.

FIG. 10 presents an application with current limited switches, relevant to the subject of driving electromechanical motors. In this case, four outputs Q11, Q12, Q13, Q14 from a stepper motor driver 62 are used for switch control as well as high voltage sources. A switch unit S20 comprises four transistors T3–T6, three resistors R21–R23 and two diodes D35–D36. R21 has in this embodiment a value of 59 Ω and R22 and R23 have a value of 330 kΩ. If Q11 is low and Q12 is high, the transistor T6 will conduct and the voltage of the attached motor phase 10A will decrease with a rate given by a given current, in this case 10 mA. At 10 mA current through the resistor R21, the voltage drop over R21 will cause T5 to conduct. T5 effectively steels base current from T6, which therefore can not conduct beyond this limit. If instead Q11 is high and Q12 is low, an analogous situation occurs with T3 and T4, and the attached motor element is charged with the rate of 10 mA. If both Q11 and Q12 are high, the output impedance from the switch circuit S20 will be high, i.e. the voltage of the motor phase is left floating. This can be of advantage if one wish to position the voltage somewhere in between high and low, as described below.

In FIG. 10, another three switching circuits S21–S23 and a respective motor phase 10B–10D are illustrated, connected to the same stepper motor driver 62. The motor phases are interconnected by resistors R24–R27. The floating point of each motor element is thus defined by the voltage of two adjacent motor phases, giving half of the maximum voltage for a normal operation of the stepper motor driver 62.

Figure 11:
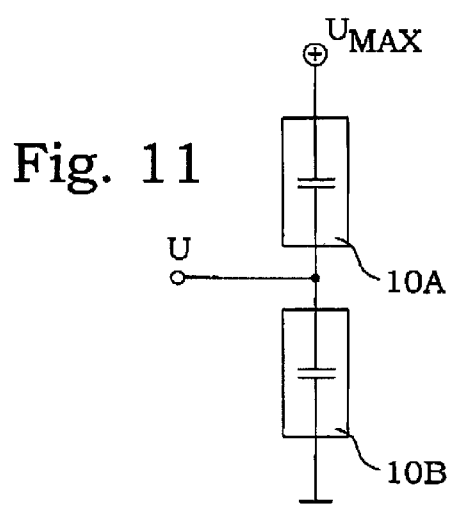
FIG. 11 is a circuit diagram illustrating a serial connection of motor phases.

In some of the previous discussions, when one motor phase was charged, another was simultaneously recharged, so that the sum of the two phase voltages was at all times kept equal to the maximum voltage. This is a rather common choice of operation for the electromechanical motors in question, and although we so far have presented sketches with each phase referenced to ground, an alternative arrangement is to connect the two motor phases in series, and to chose to reference one of the two phases to the maximum voltage. This arrangement is shown in FIG. 11, effectively reducing the number of motor terminals to be subject of voltage regulation. In case the number of motor elements is four or more, the number of motor cables are reduced by this arrangement as well.

Figure 12:
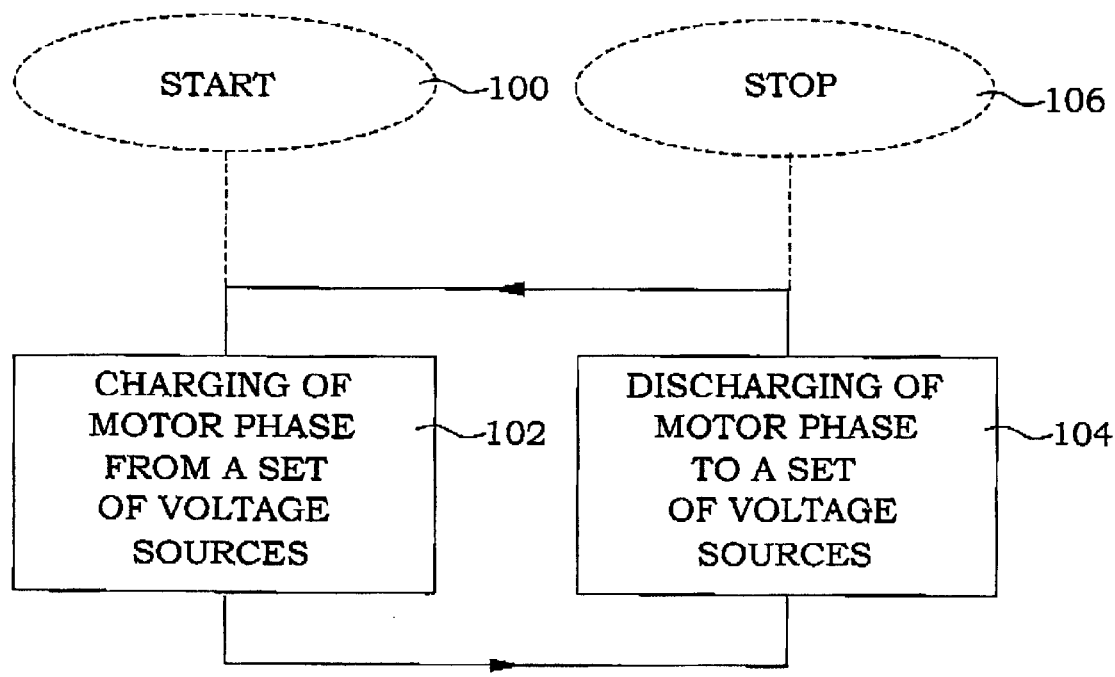
FIG. 12 is a flow diagram illustrating the basic steps in a method according to the present invention.

In FIG. 12, a flow diagram illustrating the basic concepts of a method according to the present invention is illustrated. The method is basically a repetition of two main steps, a charging step 102 and a discharging step 104. A start step 100 is present in the beginning of the operation sequence and a stop step 106 is present in the end of the operation sequence. Both the charging step 102 and the discharging step 104 comprises the step of performing charge transfer between the motor phase and a set of voltage sources, one at a time.

Sometimes, it is desirable to charge the motor phases with a specified charge, rather than to a given voltage. This is sometimes referred to as current-controlled cycling. Regarding energy saving, this is all the same, and the inventions described in this paper can still be used. The only fundamental difference is that the final voltage is not known beforehand, making switch control logic more complex. Furthermore, at slow motion, these motors do not consume much power, so that one might consider transistor-regulated prior art for fine positioning at slow speed, while using the present inventions for running the motor at high speed. It is also possible to combine conventional techniques with the embodiments of the present disclosure, e.g. feeding a conventional final amplifier by the voltage sources according to the present invention.

It will be understood by those skilled in the art that various modifications and changes may be made to the present invention without departure from the scope thereof, which is defined by the appended claims.

REFERENCES

[1] "Trends and Challenges in New Piezoelectric Actuator Applications (review)", K. Spanner and W. W. Wolny, ACTUATOR 96, 5th International Conference on New Actuators, Jun. 26–28, 1996, Bremen, Germany, pp. 140–146.

[2] "Modelling of Piezoactuators and a Newly Developed Control Unit for Inside-automotive Applications", T. Vetter and H. C. Reuss, ACTUATOR 96, 5th International Conference on New Actuators, Jun. 26–28, 1996, Bremen, Germany, pp. 187–192.

[3] "New Approach to a Switching Amplifier for Piezoelectric Actuators" by H. Janocha and C. Stiebel, in ACTUATOR 98, 6th International Conference on New Actuators, Jun. 17–19, 1998, Bremen, Germany, pp.189–192.

What is claimed is:

1. Method for driving an electromechanical motor or other actuator having a capacitive motor phase, comprising a repetition of the steps of:

charging and discharging said capacitive motor phase, and performing charge transfer between said capacitive motor phase and a set of voltage sources, one at a time; and supporting voltage sources in said set of voltage sources by capacitive voltage stepping-up.

2. Method according to claim 1, wherein said capacitive voltage stepping-up in turn comprises the step of diode-capacitor-based charge pumping.

3. Method according to claim 1, further comprising the steps of:
   electrically storing at least a part of the energy released in said discharging step; and
   using at least a part of said stored energy in a charging step.

4. Method according to claim 1, wherein essentially all of said charge transfer have a resistive voltage drop being low compared with a total voltage change of said motor phase during the entire charging or discharging operation, respectively.

5. Method according to claim 1, further comprising the step of using another motor phase of an electromechanical motor as part of said voltage sources.

6. Method according to claim 2, further comprising the steps of:
   electrically storing at least a part of the energy released in said discharging step; and
   using at least a part of said stored energy in a charging step.

7. Method according to claim 2, wherein essentially all of said charge transfer have a resistive voltage drop being low compared with a total voltage change of said motor phase during the entire charging or discharging operation, respectively.

8. Method according to claim 2, further comprising the step of using another motor phase of an electromechanical motor as part of said voltage sources.

9. Driving device for an electromechanical motor or other actuator having a capacitive motor phase, comprising:
   charging/discharging means for charging said capacitive motor phase,
   said charging/discharging means in turn comprising:
      a set of voltage sources,
      switching means connecting said voltage sources to said capacitive motor phase, one at a time, and
      a capacitive voltage step-up device, supporting or being itself said voltage sources.

10. Device according to claim 9, wherein said capacitive voltage step-up device in turn comprises a charge pump based on diodes.

11. Device according to claim 9, wherein said charging/discharging means further comprises energy storing means for electrically storing at least a part of the energy released during discharging of said capacitive motor phase and for using at least a part of said stored energy for charging a capacitive motor phase.

12. Device according to claim 9, wherein at least two of said voltage sources provide voltages of different magnitudes above ground, at all instances.

13. Device according to claim 9, wherein at least one of said voltage sources is capacitively buffered.

14. Device according to claim 9, wherein at least one of said voltage sources is capacitively non-buffered.

15. Device according to claim 9, wherein a second capacitive motor phase of an electromechanical motor is at least a part of said voltage sources.

16. Device according to claim 10, wherein said charging/discharging means further comprises energy storing means for electrically storing at least a part of the energy released during discharging of said capacitive motor phase and for using at least a part of said stored energy for charging a capacitive motor phase.

17. Device according to claim 10, wherein at least two of said voltage sources provide voltages of different magnitudes above ground, at all instances.

18. Device according to claim 10, wherein at least one of said voltage sources is capacitively buffered.

19. Device according to claim 10, wherein at least one of said voltage sources is capacitively non-buffered.

20. Device according to claim 10, wherein a second capacitive motor phase of an electromechanical motor is at least a part of said voltage sources.

21. Electromechanical motor or other actuator, comprising a number of capacitive motor phases and a driving device, said driving device comprising:
   charging/discharging means for charging said capacitive motor phase,
   said charging/discharging means in turn comprising:
      a set of voltage sources,
      switching means connecting said voltage sources to said capacitive motor phase, one at a time, and
      a capacitive voltage step-up device, supporting or being itself said voltage sources.

22. Electromechanical motor or other actuator according to claim 21, wherein said capacitive voltage step-up device in turn comprises a charge pump based on diodes.

* * * * *